United States Patent [19]

Arrandale et al.

[11] 3,924,767

[45] Dec. 9, 1975

[54] PLASTIC COATED CONTAINERS HAVING EMBEDDED FRICTION REDUCING PARTICLES

[75] Inventors: Roy S. Arrandale, Elmira; Edward R. Campagna, Horseheads, both of N.Y.

[73] Assignee: Dart Industries Inc., Los Angeles, Calif.

[22] Filed: Sept. 30, 1971

[21] Appl. No.: 185,051

[52] U.S. Cl.............. 215/12 R; 427/198; 427/202; 427/204; 427/256; 428/35
[51] Int. Cl.$^2$.. B05D 5/00; B05D 1/36; B65D 11/16
[58] Field of Search.............. 117/18, 31, 9, 97, 94, 117/33; 215/1 C, 12, DIG. 6, 100; 252/12; 193/38; 427/256, 198, 204, 202; 428/35

[56] References Cited
UNITED STATES PATENTS

| | | |
|---|---|---|
| 912,171 | 2/1909 | Rock..................... 117/18 |
| 2,174,193 | 9/1939 | Mickelson et al..................... 193/38 |
| 2,383,470 | 8/1945 | Morgan...................... 117/94 UX;6 |
| 2,555,319 | 6/1951 | Cross................... 117/33 X |
| 2,655,453 | 10/1953 | Sandberg........................... 117/36.1 |
| 2,929,525 | 3/1960 | Glover et al...................... 215/12 R |
| 3,355,311 | 11/1967 | Gosselink............................. 117/33 |
| 3,542,229 | 11/1970 | Beyerlein et al............. 215/12 R X |
| 3,549,531 | 12/1970 | Santt................................ 252/12 X |
| 3,604,584 | 9/1971 | Shank........................ 215/12 R |
| D38,579 | 5/1907 | Blood............................ 222/92 X |

*Primary Examiner*—Ralph Husack
*Assistant Examiner*—Shrine P. Beck

[57] ABSTRACT

A plastic or plastic coated container having characteristics in container handling apparatus. The exterior surface of the container is provided with hard smooth particles or protrusions which act to reduce friction between the container and articles contacting the container.

2 Claims, 3 Drawing Figures

INVENTORS.
ROY S. ARRANDALE
EDWARD R. CAMPAGNA
BY
Michael L. Dunn
ATTORNEY

PLASTIC COATED CONTAINERS HAVING EMBEDDED FRICTION REDUCING PARTICLES

BACKGROUND OF THE INVENTION a. Field of the Invention

This invention concerns plastic or plastic coated containers such as plastic coated glass bottles and more particularly concerns plastic or plastic coated containers which are treated to reduce frictional resistance of the container in filling and other container handling apparatus.

b. History of the Prior Art

As is well known in the art, the use of plastic containers has recently increased significantly. Plastic is also being used to coat containers made of other materials such as glass to protect the glass and reduce the hazards of flying glass if the glass container should break. For example, glass aerosol bottles may be coated with a vinyl plastic resin to reduce the above hazards.

Plastic and plastic coated bottles, particularly plastic and plastic coated containers coated with relatively soft plastics such as low density polyethylene or polyvinyl chloride, have a serious disadvantage in that the frictional characteristics of the exterior plastic surfaces are very undesirable. The plastic surfaces will not easily slide, thus reducing speeds at which container handling apparatus can handle the containers with increased likelihood that the containers will frictionally catch and fall, or be caught on other containers or portions of the apparatus causing jamming.

BRIEF DESCRIPTION OF THE INVENTION

In accordance with this invention, a novel container having an exterior plastic surface is provided which has a substantially reduced co-efficient of friction. The reduced co-efficient of friction is obtained by partially embedding or otherwise attaching relatively hard, smooth particles on the plastic surface. The particles, rather than the plastic, then contact any surfaces which touch the container. It is particularly important that the supporting surface of the container have such particles attached so that the container will slide freely through handling apparatus. If the container is a plastic coated container of hard material such as a plastic coated glass bottle, the friction may alternatively be reduced by molding raised points into the glass or other hard container material and providing a plastic coating between the raised points so that the uncoated raised points, rather than the plastic contact of any surfaces which touch the container, thus reducing the friction.

PREFERRED EMBODIMENT

In accordance with this invention, hard, smooth particles may be embedded in or otherwise attached to the plastic surface of a container to reduce friction. The particles may be any suitable material such as glass, metal, sand, or hard plastic particles such as epoxy beads.

Preferably the particles have smooth curved surfaces, such as the surfaces of glass beads. Alternatively, a container having an interior portion made of a hard material such as glass or metal, may be provided with protrusions. A relatively soft plastic coating or covering is then applied over said interior portion, but is prevented from covering the outermost portion of the protrusions which then act to reduce friction against surfaces which contact the container.

Figure 1:
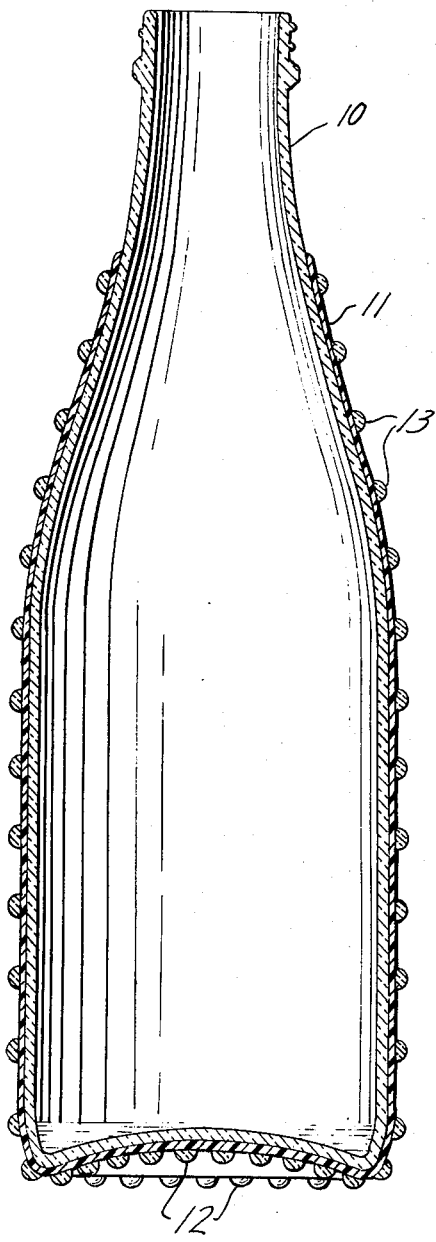
FIG. 1 shows a cross sectional view of a glass container having a plastic coating with embedded glass beads.
Figure 2:
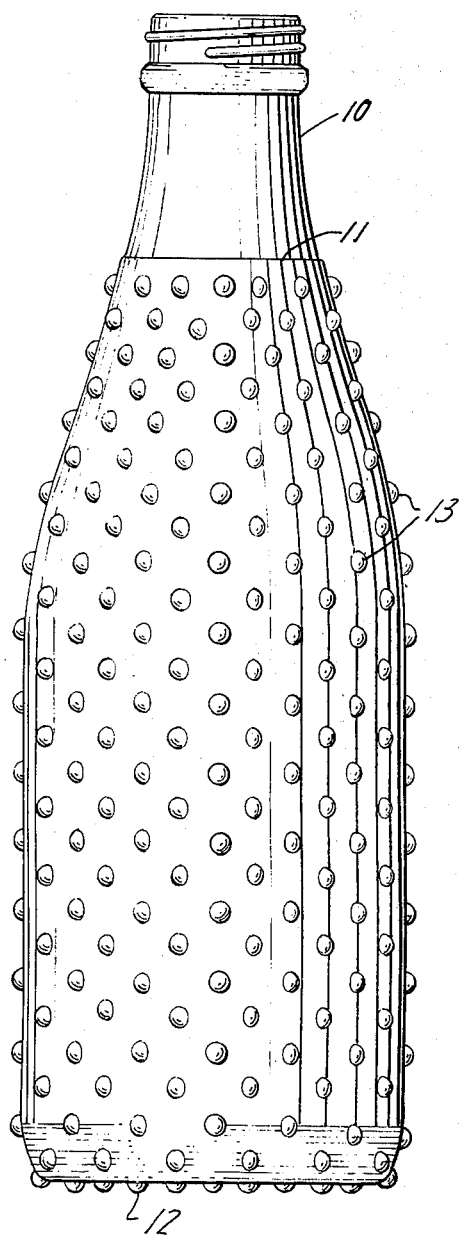
FIG. 2 shows a front elevational view of the glass container shown in FIG. 1 having a plastic coating with embedded glass beads.

Referring now to the drawings, FIGS. 1 and 2 show a glass container 10 coated with a plastic covering 11 which may be of any suitable plastic material such as epoxy, polyester, or vinyl polymers such as polyvinyl chloride, polystyrene, polyethylene, polypropylene or ABS. As shown in FIGS. 1 and 2, plastic covering 11 has hard smooth particles 13 such as spherical glass beads embedded or otherwise attached to plastic covering 11 so that particles 13 will contact any surfaces which touch the bottle and reduce the friction between the touching surface and the bottle.

Figure 3:
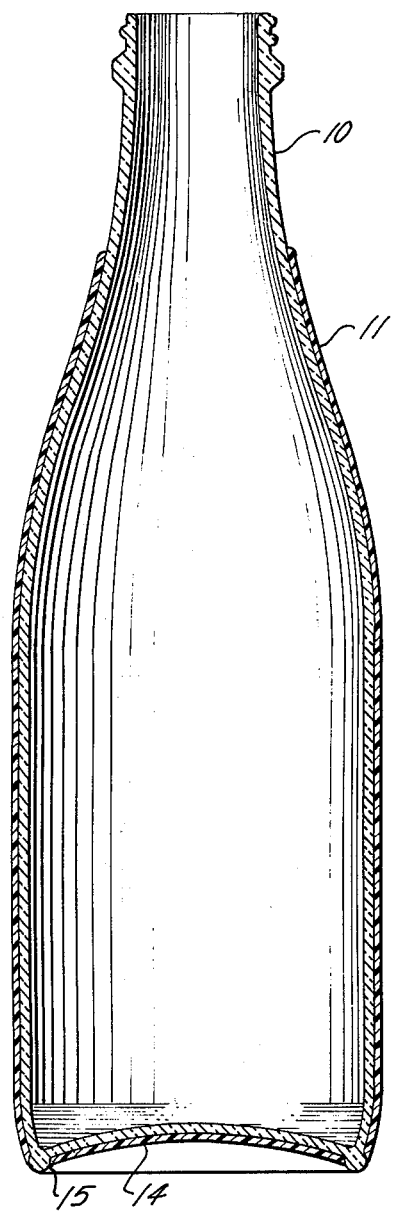
FIG. 3 shows a cross sectional view of a second embodiment of a glass container having a plastic coating, wherein the glass container is provided with projection uncoated with plastic material.

As an alternative, as shown in FIG. 3, a protrusion 15 of a container made of a hard substance such as glass may be permitted to extend through a plastic coating thus permitting the hard substance of the protrusion to contact surfaces which touch the container thus reducing friction.

In bottles which depend upon friction reducing particles, any particle may be used to assist in reducing friction provided the frictional characteristics of the particle are superior to the frictional characteristics of the plastic covering 11. In general the particle must be either smoother or harder or both smoother and harder than the plastic covering. In addition, the particles should be large enough and have a great enough curvature so that the particles will not have a tendency to form depressions in touching surfaces or act as an abrasive. For example, the particles should not pass through a 100 mesh screen and preferably should be of a 50 mesh size or larger.

Best results are obtained in reducing friction when the particles have a Shore Hardness in excess of D80 and a roughness height of less than about 7 microns. The harder the material and the smoother the surface, the better the result in reducing friction For example, unsoftened epoxy beads may be used since they generally have a shore hardness of about D85 and also generally have smooth surfaces. Glass beads, however, are superior since the hardness is completely off the Shore Scales and also have very smooth surfaces.

EXAMPLE 1

A glass bottle is coated with polyethylene and glass beads having a size of 20 – 30 mesh are then partially embedded into the polyethylene structure at the base of the bottle; after the polyethylene has hardened, the bottle is placed on its base on a steel plate. A string is then tied around the bottle about half way between the base and the top and is directed around a pulley so that the string hangs in a downward direction. A weight pan is then secured to the downwardly hanging free end of the string. Weights are then placed on the pan to determine how much force is required to cause the bottle to move on the steel plate. When sufficient beads are firmly embedded in the plastic at the base of the bottle, it requires weights of about 30 grams to cause the bottle to slide along the steel plate.

EXAMPLE 2

The procedure of Example 1 is followed except an uncoated, unbeaded glass bottle is used. It requires weights of about 25 grams to cause the bottle to slide.

EXAMPLE 3

The procedure of Example 1 is followed except a bottle coated with polyethylene is used without being impregnated with glass beads. It requires weights of between about 50 and about 75 grams to cause the bottle to slide.

EXAMPLE 4

The procedure of Example 1 is followed except epoxy beads having a Shore hardness of about D85 and a mesh size of about 30 were substituted for the glass beads. It requires a force of about 40 grams to cause the bottle to slide.

EXAMPLE 5

The procedure of Example 1 is followed except sand is substituted for the glass beads. It requires weights of between about 40 and 60 grams to cause the bottle to move.

From the above examples, it seems clear that the harder and the smoother the particles embedded in the polyethylene coated, the lower the frictional resistance to motion on the steel plate. The glass bottle having no plastic coating moved with the least weight in the pan at 25 grams, followed by the coated bottle impregnated with glass beads at 30 grams. The bottle offering the highest frictional resistance was the polyethylene coated bottle having no hard particles in the interior surface. The Shore Hardness of the polyethylene coating is about D40 to about D50.

What is claimed is:

1. A container having improved frictional and handling characteristics in container handling apparatus, said container comprising an interior glass receptacle formed as a glass bottle and an exterior resinous plastic surface and a plurality of particles secured to said exterior plastic surface; said particles having exposed outwardly extending particle surfaces adapted to contact articles which touch said container, said particle surfaces further being hard and smooth relative to said container plastic surface so that friction will be reduced between said container and said articles due to contact of said hard smooth particle surface with said articles.

2. A container having improved frictional and handling characteristics in container handling apparatus, said container comprising an interior glass receptacle formed as a glass bottle and covered by a relatively soft resinous plastic coating, said glass receptacle being provided with protrusions which extend through said exterior plastic coating, said protrusions being adapted to contact articles which touch said container so that friction will be reduced between said container having said plastic coating and said articles.

* * * * *